US008161323B2

(12) United States Patent
Kuchibhotla et al.

(10) Patent No.: US 8,161,323 B2
(45) Date of Patent: Apr. 17, 2012

(54) HEALTH MONITOR

(75) Inventors: Balasubrahmanya Kuchibhotla, San Ramon, CA (US); Jonathan Klein, Redwood City, CA (US); Karl Dias, Foster City, CA (US); Uri Shaft, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 12/252,128

(22) Filed: Oct. 15, 2008

(65) Prior Publication Data
US 2009/0106605 A1    Apr. 23, 2009

Related U.S. Application Data

(60) Provisional application No. 60/981,456, filed on Oct. 19, 2007.

(51) Int. Cl.
G06F 11/00    (2006.01)
(52) U.S. Cl. ............ 714/25; 714/47.1; 714/47.2; 714/48
(58) Field of Classification Search .................. None
See application file for complete search history.

(56) References Cited

U.S. PATENT DOCUMENTS

| | | | |
|---|---|---|---|
| 4,866,635 A | 9/1989 | Kahn et al. | |
| 5,067,099 A | 11/1991 | McCown et al. | |
| 5,123,017 A | 6/1992 | Simpkins et al. | |
| 5,309,448 A | 5/1994 | Bouloutas et al. | |
| 5,845,272 A | 12/1998 | Morjaria et al. | |
| 5,920,489 A | 7/1999 | Dibrino et al. | |
| 5,922,079 A | 7/1999 | Booth et al. | |
| 5,968,122 A | 10/1999 | Schlosser et al. | |
| 6,012,152 A | 1/2000 | Douik et al. | |
| 6,125,311 A | 9/2000 | Lo | |
| 6,182,249 B1 | 1/2001 | Wookey et al. | |
| 6,208,955 B1 | 3/2001 | Provan et al. | |
| 6,237,114 B1 | 5/2001 | Wookey et al. | |
| 6,243,628 B1 | 6/2001 | Bliley et al. | |
| 6,349,335 B1 * | 2/2002 | Jenney ......................... 709/224 | |

(Continued)

FOREIGN PATENT DOCUMENTS

EP    633536 A1    1/1995

OTHER PUBLICATIONS

Alexandru, M., et al., "An architectural system solution for technical diagnosis," pp. TuD5-17-TuD5-22, International Society of Information Fusion (ISIF), Copyright 2000. [Can also be found in Information Fusion 2000, Jul. 10-13, 2000, vol. 1.].

(Continued)

Primary Examiner — Michael Maskulinski
(74) Attorney, Agent, or Firm — Kilpatrick Townsend & Stockton LLP

(57) ABSTRACT

Techniques for proactively and reactively running diagnostic functions. These diagnostic functions help to improve diagnostics of conditions detected in a monitored system and to limit/quarantine the damages caused by the detected conditions. In one embodiment, a health monitor infrastructure is provided that is configured to perform one or more health checks in a monitored system for diagnosing and/or gathering information related to the system. The one or more health checks may be invoked pro-actively on a scheduled basis, reactively in response to a condition detected in the system, or may even be invoked manually by a user such as a system administrator.

18 Claims, 7 Drawing Sheets

U.S. PATENT DOCUMENTS

| | | |
|---|---|---|
| 6,434,512 B1 | 8/2002 | Discenzo |
| 6,519,552 B1 | 2/2003 | Sampath et al. |
| 6,535,865 B1 | 3/2003 | Skaaning et al. |
| 6,539,337 B1 | 3/2003 | Provan et al. |
| 6,604,141 B1 | 8/2003 | Ventura |
| 6,615,090 B1 | 9/2003 | Blevins et al. |
| 6,633,782 B1 | 10/2003 | Schleiss et al. |
| 6,665,425 B1 | 12/2003 | Sampath et al. |
| 6,681,215 B2 | 1/2004 | Jammu |
| 6,697,810 B2 | 2/2004 | Kumar et al. |
| 6,697,962 B1 | 2/2004 | McCrory et al. |
| 6,738,811 B1* | 5/2004 | Liang .................. 709/224 |
| 6,782,345 B1 | 8/2004 | Siegel et al. |
| 6,862,698 B1 | 3/2005 | Shyu |
| 6,892,317 B1 | 5/2005 | Sampath et al. |
| 6,910,000 B1 | 6/2005 | Yedidia et al. |
| 6,915,128 B1 | 7/2005 | Oh |
| 6,944,800 B2 | 9/2005 | Brundridge et al. |
| 6,983,200 B2 | 1/2006 | Bodin et al. |
| 6,985,901 B1 | 1/2006 | Sachse et al. |
| 7,062,749 B2 | 6/2006 | Cyr et al. |
| 7,096,387 B2 | 8/2006 | Durrant et al. |
| 7,113,988 B2 | 9/2006 | Chirashnya et al. |
| 7,124,328 B2 | 10/2006 | Bowers et al. |
| 7,165,190 B1* | 1/2007 | Srivastava et al. ......... 714/38.14 |
| 7,177,769 B2 | 2/2007 | Larsson et al. |
| 7,257,744 B2 | 8/2007 | Sabet et al. |
| 7,281,040 B1 | 10/2007 | Ly |
| 7,281,170 B2 | 10/2007 | Taylor et al. |
| 7,308,385 B2 | 12/2007 | Wegerich et al. |
| 7,313,735 B1* | 12/2007 | Levergood et al. ............ 714/47 |
| 7,500,143 B2 | 3/2009 | Buia et al. |
| 7,525,910 B2 | 4/2009 | Wen |
| 7,546,222 B2 | 6/2009 | Chintalapti et al. |
| 7,577,872 B2 | 8/2009 | DiBartolomeo et al. |
| 7,603,674 B2 | 10/2009 | Cyr et al. |
| 7,668,953 B1 | 2/2010 | Sinclair et al. |
| 7,802,144 B2 | 9/2010 | Vinberg et al. |
| 7,937,623 B2 | 5/2011 | Ramacher et al. |
| 7,941,707 B2 | 5/2011 | Sarig et al. |
| 7,954,090 B1 | 5/2011 | Qureshi et al. |
| 8,032,625 B2 | 10/2011 | Benfield et al. |
| 2003/0033559 A1 | 2/2003 | Williams |
| 2003/0074607 A1 | 4/2003 | Brundridge et al. |
| 2004/0078683 A1 | 4/2004 | Buia et al. |
| 2004/0078695 A1 | 4/2004 | Bowers et al. |
| 2004/0078727 A1 | 4/2004 | Little et al. |
| 2004/0153429 A1 | 8/2004 | Horn et al. |
| 2004/0193956 A1* | 9/2004 | Greenlee et al. ................ 714/25 |
| 2005/0102567 A1 | 5/2005 | McGuire et al. |
| 2005/0120273 A1 | 6/2005 | Hudson et al. |
| 2005/0160325 A1* | 7/2005 | Ogino et al. .................... 714/47 |
| 2005/0210331 A1 | 9/2005 | Connelly et al. |
| 2005/0228880 A1 | 10/2005 | Champlin |
| 2006/0150156 A1 | 7/2006 | Cyr et al. |
| 2006/0200711 A1 | 9/2006 | Schondelmayer et al. |
| 2006/0256727 A1 | 11/2006 | Acharya et al. |
| 2007/0021966 A1 | 1/2007 | Ellefson et al. |
| 2007/0283329 A1 | 12/2007 | Caprihan et al. |
| 2007/0294003 A1 | 12/2007 | Underdal et al. |
| 2008/0065706 A1 | 3/2008 | Miller et al. |
| 2008/0109796 A1 | 5/2008 | Kosche |
| 2008/0125877 A1 | 5/2008 | Miller et al. |
| 2008/0133978 A1 | 6/2008 | Angamuthu et al. |
| 2008/0141072 A1 | 6/2008 | Kalgren et al. |
| 2008/0189488 A1 | 8/2008 | DeWitt et al. |
| 2008/0208784 A1 | 8/2008 | Hill et al. |
| 2008/0208787 A1 | 8/2008 | Luchene |
| 2008/0255885 A1 | 10/2008 | Eisenberger et al. |
| 2008/0263399 A1 | 10/2008 | Cousin et al. |
| 2008/0282095 A1 | 11/2008 | Haider et al. |
| 2008/0297375 A1 | 12/2008 | Khuzadi |
| 2009/0028055 A1 | 1/2009 | Zaencker et al. |
| 2009/0083576 A1 | 3/2009 | Vlassova et al. |
| 2009/0105982 A1 | 4/2009 | Sarig et al. |
| 2009/0105989 A1 | 4/2009 | Ramacher et al. |
| 2009/0105991 A1 | 4/2009 | Ramacher et al. |
| 2009/0106180 A1 | 4/2009 | Kuchibhotla et al. |
| 2009/0106262 A1 | 4/2009 | Fallen et al. |
| 2009/0106278 A1 | 4/2009 | Ramacher et al. |
| 2009/0106363 A1 | 4/2009 | Fallen et al. |
| 2009/0106589 A1 | 4/2009 | Ramacher et al. |
| 2009/0106595 A1 | 4/2009 | Sarig et al. |
| 2009/0106596 A1 | 4/2009 | Fallen et al. |
| 2009/0106601 A1 | 4/2009 | Ngai et al. |
| 2009/0327815 A1 | 12/2009 | Sridharan et al. |
| 2010/0100778 A1* | 4/2010 | Sullivan ...................... 714/57 |
| 2010/0257410 A1 | 10/2010 | Cottrell et al. |
| 2010/0318847 A1 | 12/2010 | Beg et al. |
| 2010/0318853 A1 | 12/2010 | Beg et al. |
| 2010/0318855 A1 | 12/2010 | Beg et al. |
| 2011/0153540 A1 | 6/2011 | Beg et al. |

OTHER PUBLICATIONS

U.S. Appl. No. 12/485,759, filed Jun. 16, 2009, Beg et al.

U.S. Appl. No. 12/485,763, filed Jun. 16, 2009, Beg et al.

U.S. Appl. No. 12/485,766, filed Jun. 16, 2009, Beg et al.

U.S. Appl. No. 12/641,038, filed Dec. 17, 2009, Beg et al.

Avin, C., et al., "Identifiability of Path-Specific Effects," UCLA Cognitive Systems Laboratory, Technical Report R-321 of Jun. 2005, in Proceedings of the 19$^{th}$ International Joint Conference on Artificial Intelligence, Edinburgh, Scotland, Aug. 2005, 7 pages.

Haicheng, W., et al., "Research on The Function Model of Distributed Intelligent Monitoring and Diagnosis System Based on Multi-Agent," in Electronic Measurement and Instruments, 2007, The Eighth International Conference on Electronic Measurement and Instruments, ICEMI 2007, pp. 3-393-3-396, Copyright 2007 IEEE.

Halpern, J. Y., et al., "Causes and Explanations: A Structural-Model Approach—Part I: Causes," Technical Report R-266-UAI of Jun. 2001, in Proceedings of the Seventeenth Conference on Uncertainty in Artificial Intelligence, San Francisco, CA, 2001, pp. 194-202. [Can also be found in British Journal of Philosophy of Science, vol. 56, 2005, pp. 843-887.]

Halpern, J. Y., et al., "Causes and Explanations: A Structural-Model Approach—Part II: Explanations," Technical Report R-266-IJCAI of Jun. 2001, in Proceedings of the Seventeenth International Joint Conference on Artificial Intelligence (IJCAI), San Francisco, CA, 2001, 8 pages. [Can also be found in British Journal of Philosophy of Science, vol. 56, 2005, pp. 889-911.]

Jongsawat, N., et al., "Dynamic Data Feed to Bayesian Network Model and SMILE Web Application," in Ninth ACIS International Conference on Software Engineering, Artificial Intelligence, Networking, and Parallel/Distributed Computing, pp. 931-936, Copyright 2008 IEEE.

Morjaria, M., et al., "Monitoring Complex Systems with Causal Networks," IEEE Computational Science & Engineering, vol. 3, Issue 4, Winter 1996, pp. 9-10.

Nielsen, U. H., et al., "Explanation Trees for Causal Bayesian Networks," 8 pages. [Can also be found in Proceedings of the 24$^{th}$ Annual Conference on Uncertainty in Artificial Intelligence (UAI-08), 2008, pp. 427-434.]

Pearl, J., "Causal Diagrams for Empirical Research (With Discussions)," Technical Report R-218-B, Biometrika, vol. 82, No. 4, 1995, pp. 669-710, printed in Great Britain.

Pearl, J., "Causal Inference in Statistics: An Overview," Technical Report R-350 of Sep. 2009, Statistics Surveys, vol. 3, 2009, pp. 96-146.

Pearl, J., "Direct and Indirect Effects," Technical Report R-273-UAI of Jun. 2001, In Proceedings of the Seventeenth Conference on Uncertainty in Artificial Intelligence, San Francisco, CA, 2001, pp. 411-420.

Pearl, J., "Robustness of Causal Claims," Technical Report R-320 of Mar. 2004, Submitted to the 20$^{th}$ Conference on Uncertainty in Artificial Intelligence, Banff, Canada, Jul. 2004, 8 pages. [Can also be found in Proceedings of the 20$^{th}$ Conference on Uncertainty in Artificial Intelligence, AUAI Press, Arlington, VA, Jul. 2004, pp. 446-453.]

Pearl, J., "Simpson's Paradox: An Anatomy," Technical Report R-264, Extracted from Chapter 6 of Causality, Apr. 1999, pp. 1-11.

Pearl, J., "Statistics and Causal Inference: A Review," Test Journal, vol. 12, No. 2, Dec. 2003, pp. 281-345.

Pearl, J., "The Logic of Counterfactuals in Causal Inference (Discussion of 'Causal Inference without Counterfactuals' by A.P. Dawid)," Technical Report R-269 of Apr. 2000, in Journal of American Statistical Association, vol. 95, No. 450, Jun. 2000, pp. 428-435.

Tian, J., et al., "A General Identification Condition for Causal Effects," Technical Report R-290-A of Aug. 2002, in Proceedings of the Eighteenth National Conference on Artificial Intelligence, AAAI Press/The MIT Press: Menlo Park, CA, Aug. 2002, pp. 567-573.

Tian, J., et al., "Probabilities of Causation: Bounds and Identification," Technical Report R-271-A of Feb. 2000, in Annals of Mathematics and Artificial Intelligence, vol. 28, 2000, pp. 287-313.

Uraikul, V., "Artificial Intelligence for Monitoring and Supervisory Control of Process Systems," Science Direct, in Engineering Applications of Artificial Intelligence, vol. 20, Issue 2, Mar. 2007, 17 pages (pp. 115-131 in publication), Copyright 2006 Elsevier Ltd.

Yu, J., et al., "Intelligent Monitoring and Diagnosis of Manufacturing Processes Using an Integrated Approach of KBANN and GA," Science Direct, in Computers in Industry, vol. 59, Issue 5, May 2008, 13 pages (pp. 489-501 in publication), Copyright 2007 Elsevier B.V.

Zhang, D., et al., "Researches and Application of a Hybrid Fault Diagnosis Expert System," Proceedings of the $3^{rd}$ World Congress on Intelligent Control and Automation, Jun. 28-Jul. 2, 2000, Hefei, P.R. China, pp. 215-219, Copyright 2000 IEEE.

Non-Final Office Action for U.S. Appl. No. 12/251,671 mailed on Sep. 17, 2010; 13 pages.

Non-Final Office Action for U.S. Appl. No. 12/251,700 mailed on Jul. 19, 2010; 16 pages.

Non-Final Office Action for U.S. Appl. No. 12/252,056 mailed on Sep. 21, 2010; 17 pages.

Non-Final Office Action for U.S. Appl. No. 12/251,731 mailed on Mar. 2, 2011; 36 pages.

Non-Final Office Action for U.S. Appl. No. 12/251,677 mailed on Mar. 1, 2011; 24 pages.

Non-Final Office Action for U.S. Appl. No. 12/251,648 mailed on Mar. 1, 2011; 35 pages.

Office Communication for U.S. Appl. No. 12/251,671 mailed on Feb. 9, 2011; 4 pages.

Non-Final Office Action for U.S. Appl. No. 12/485,766 mailed on Jan. 25, 2011; 21 pages.

Notice of Allowance for U.S. Appl. No. 12/252,056 mailed on Jan. 6, 2011; 6 pages.

Notice of Allowance for U.S. Appl. No. 12/251,671 mailed on Jan. 5, 2011; 6 pages.

Final Office Action for U.S. Appl. No. 12/251,700 mailed on Dec. 29, 2010; 14 pages.

Non-Final Office Action for U.S. Appl. No. 12/485,759 mailed on Dec. 21, 2010; 21 pages.

Non-Final Office Action for U.S. Appl. No. 12/251,743 mailed on Dec. 14, 2010; 19 pages.

Non-Final Office Action for U.S. Appl. No. 12/251,661 mailed on Nov. 10, 2010; 18 pages.

Non-Final Office Action for U.S. Appl. No. 12/251,711 mailed on Nov. 9, 2010; 18 pages.

Notice of Allowance for U.S. Appl. No. 12/251,700 mailed on Sep. 30, 2011, 10 pages.

Final Office Action for U.S. Appl. No. 12/251,731 mailed on Sep. 23, 2011, 23 pages.

Notice of Allowance for U.S. Appl. No. 12/251,667 mailed on Sep. 20, 2011, 9 pages.

Non-Final Office Action for U.S. Appl. No. 12/251,648 mailed on Sep. 20, 2011, 25 pages.

Non-Final Office Action for U.S. Appl. No. 12/252,070 mailed on Aug. 25, 2011, 7 pages.

Notice of Allowance for U.S. Appl. No. 12/251,711 mailed on Aug. 11, 2011, 1 page.

Notice of Allowance for U.S. Appl. No. 12/485,766 mailed on Aug. 10, 2011, 1 page.

Final Office Action for U.S. Appl. No. 12/485,759 mailed on Aug. 8, 2011, 12 pages.

Non-Final Office Action for U.S. Appl. No. 12/251,743 mailed on Jul. 19, 2011, 11 pages.

Final Office Action for U.S. Appl. No. 12/251,661 mailed on Jun. 8, 2011, 15 pages.

Non-Final Office Action for U.S. Appl. No. 12/251,685 mailed on May 31, 2011, 9 pages.

Final Office Action for U.S. Appl. No. 12/251,711 mailed on May 19, 2011, 6 pages.

Office Action for U.S. Appl. No. 12/251,667 (Jan. 17, 2012).

Office Action for U.S. Appl. No. 12/251,685 (Jan. 9, 2012).

Notice of Allowance for U.S. Appl. No. 12/485,759 (Dec. 19, 2011).

Notice of Allowance for U.S. Appl. No. 12/252,070 (Feb. 8, 2012).

* cited by examiner

HEALTH MONITOR

CROSS-REFERENCES TO RELATED APPLICATIONS

This application claims the benefit and priority under 35 U.S.C. 119 (e) of U.S. Provisional Application Ser. No. 60/981,456, filed 19 Oct. 2007, entitled DIAGNOSABILITY FRAMEWORK, the contents of which are herein incorporated by reference in their entirety for all purposes.

This application also incorporates by reference for all purposes the entire contents of the following related and commonly-assigned non-provisional applications, all filed concurrently with the present application:
(1) U.S. application Ser. No. 12/252,056, now U.S. Pat. No. 7,937,632 entitled DIAGNOSABILITY SYSTEM;
(2) U.S. application Ser. No. 12/251,648 entitled RULE-BASED ENGINE FOR GATHERING DIAGNOSTIC DATA;
(3) U.S. application Ser. No. 12/251,731 entitled GATHERING CONTEXT INFORMATION USED FOR ACTIVATION OF CONTEXTUAL DUMPING;
(4) U.S. application Ser. No. 12/251,743 entitled USER-TRIGGERED DIAGNOSTIC DATA GATHERING;
(5) U.S. application Ser. No. 12/251,661 entitled DIAGNOSTIC DATA REPOSITORY;
(6) U.S. application Ser. No. 12/251,667 entitled DIAGNOSABILITY SYSTEM: FLOOD CONTROL;
(7) U.S. application Ser. No. 12/251,671, now U.S. Pat. No. 7,941,707 entitled GATHERING INFORMATION FOR USE IN DIAGNOSTIC DATA DUMPING UPON FAILURE OCCURRENCE;
(8) U.S. application Ser. No. 12/251,685 entitled INTELLIGENT COLLECTION OF DIAGNOSTIC DATA FOR COMMUNICATION TO DIAGNOSIS SITE;
(9) U.S. application Ser. No. 12/251,700 entitled SCRUBBING AND EDITING OF DIAGNOSTIC DATA;
(10) U.S. application Ser. No. 12/251,711 entitled NON-INTRUSIVE GATHERING OF DIAGNOSTIC DATA USING ASYNCHRONOUS MECHANISMS;
(11) U.S. application Ser. No. 12/252,070 entitled HEALTH METER;

BACKGROUND OF THE INVENTION

The present invention relates to system maintenance and diagnosis, and more particularly to techniques for monitoring a system by performing one or more health checks in the system.

Diagnosing defects in systems, such as Oracle database (DB) products, can be a complex and time-consuming task. Several factors may lead to and hinder the progress of accurate diagnosis of defects within such a system. For example, the data collected at the first occurrence of defects in the system is generally not sufficient to diagnose the problem completely. This requires additional collection of diagnostic data and in turn increases the time spent in diagnosing the problem. The data collected may itself lack proper organization and correlation. As a result, it becomes difficult to determine the root cause of the problem and as a result the time required to solve defects increases, thus increasing product down time and adversely affecting customer satisfactions. In addition, some error situations require analysis to be performed immediately or close to the time of defect occurrence so that time-sensitive findings about the errors can be made.

Furthermore, there is presently no mechanism available to pro-actively detect potential defects and to limit or quarantine the damages caused by these potential defects, thus causing significant impact on product availability. Additionally, some defects may require checks and/or analysis to be performed when the product is not fully available yet.

BRIEF SUMMARY OF THE INVENTION

Embodiments of the present invention provide techniques for proactively and reactively running diagnostic functions. These diagnostic functions help to improve diagnostics of conditions detected in a monitored system and to limit/quarantine the damages caused by the detected conditions. In one embodiment, a health monitor infrastructure is provided that is configured to perform one or more health checks in a monitored system for diagnosing and/or gathering information related to the system. The one or more health checks may be invoked pro-actively on a scheduled basis, reactively in response to a condition detected in the system, or may even be invoked manually by a user such as a system administrator.

According to an embodiment of the present invention, techniques are provided for method for monitoring a system. A health check is executed to determine information related to the system, wherein the health check is invoked based upon a predefined schedule or in response to one or more conditions detected in the system. The information related to the system determined from executing the health check may be output to a user.

In one embodiment, the health check is invoked based upon a predefined schedule comprises scheduling the health check in a designated maintenance window. In another embodiment, the one or more conditions detected in the system may identify an error in the system and the health check may be invoked in response to the error.

According to an embodiment of the present invention, executing the health check comprises determining a set of one or more rules configured for the system, each rule specifying one or more conditions and an action to be performed when the one or more conditions are satisfied, and determining that the one or more conditions associated with a first rule from the set of rules are satisfied by the one or more conditions detected in the system, wherein the action specified by the first rule is the health check.

In one embodiment, a crawling mode is provided for executing a health check. In the crawling mode, a health check is executed in a first time window and the execution of the health check is stopped at the end of the first time window. The execution of the health check is continued at a point of time that is subsequent to and non-contiguous from the end of the first time window using information stored from the execution of the health check in the first time window.

In one embodiment, one or more errors may be detected based upon the information determined from executing the health check. The one or more errors may be aggregated based upon information associated with the one or more errors. The validity of the errors in the one or more errors may be periodically checked. In one embodiment, a recommendation may be provided for at least one error from the one or more errors detected from executing the health check, the recommendation identifying one or more actions to be performed for repairing or mitigating an impact the at least one error.

According to an embodiment of the present invention, a reactive health check may be executed. In one embodiment, a set of one or more rules configured for the system are determined, each rule specifying one or more conditions and an action to be performed when the one or more conditions are satisfied. A first rule is determined from the set of rules whose associated one or more conditions are satisfied based upon the information determined from executing the health check. An action specified by the first rule is executed, wherein executing the action comprises executing a second health check.

In one embodiment, a report may be generated based upon the information determined from executing the health check. The report may be displayed or stored.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for proactively and reactively running diagnostic functions. These diagnostic functions help to improve diagnostics of conditions detected in a monitored system and to limit/quarantine the damages caused by the detected conditions. In one embodiment, a health monitor infrastructure is provided that is configured to perform one or more health checks in a monitored system for diagnosing and/or gathering information related to the system. The one or more health checks may be invoked pro-actively on a scheduled basis, reactively in response to a condition detected in the system, or may even be invoked manually by a user such as a system administrator.

Figure 1:
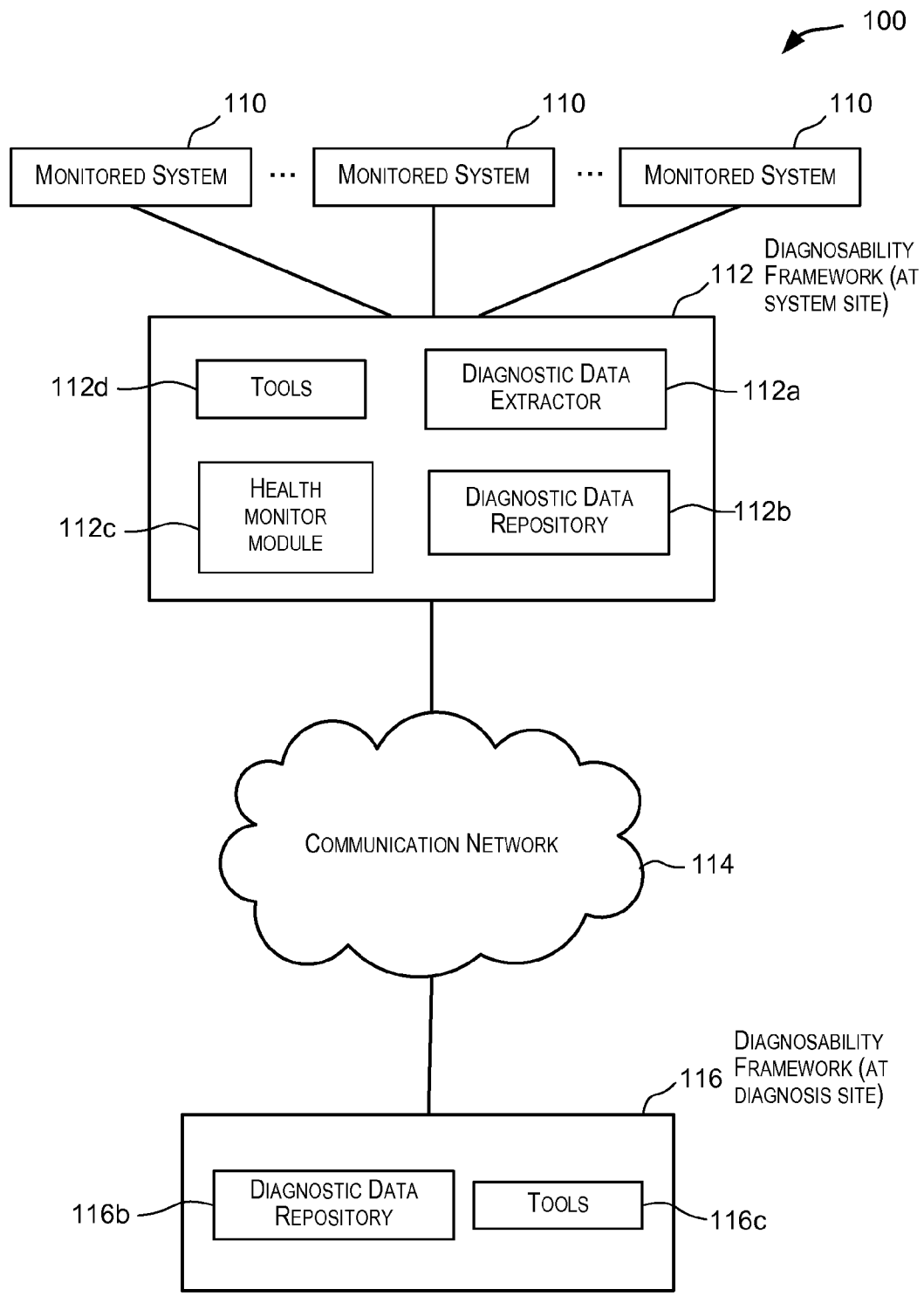
FIG. 1 is a simplified block diagram illustrating a diagnosability system according to an embodiment of the invention.

FIG. 1 is a simplified block diagram of a diagnosability system 100 according to an embodiment of the present invention. Diagnosability system 100 facilitates collection, storage, communication, and analysis of diagnostic data for or one or more monitored systems 110 (which may be different products or different instances of the same product). Monitored system 110 may be a software system, a hardware system, an enterprise system, and like. For example, monitored system 110 may be a complex enterprise software system such as a database system and related products provided by Oracle Corporation™ of California.

As depicted in FIG. 1, diagnosability system 100 comprises a diagnosability framework 112 deployed at a system site to provide diagnostic support for monitored system 110. Diagnosability system 100 also comprises a diagnosability framework 116 deployed at a diagnosis site. A diagnosis site may be, for example, a site of a vendor that is responsible for diagnosing problems that may occur in monitored system 110.

In a typical diagnostic workflow, diagnostic data is captured and stored for monitored system 110 by diagnosability framework 112. For example, diagnosability framework 112 may be configured to gather and store diagnostic data related to monitored system 110 when a condition is detected in monitored system 110. In one embodiment, the condition detected in monitored system may include an error detected in system 110. The diagnostic data collected and stored by diagnosability framework 112 may include, for example, trace data, diagnostic dumps, run reports, logs (e.g., error logs), results of diagnosability actions, and the like. Portions of the diagnostic data stored by diagnosability framework 112 may be communicated to diagnosability framework 116 located at the diagnosis site for analysis, such as failure analysis to identify and resolve root cause of the failures or errors. The diagnostic data may be communicated from diagnosability framework 112 to diagnosability framework 116 via a communication network 114. Communication network 114 may be any network capable of communicating data such as the Internet, an intranet, a switched network, and the like. Communication network 114 may include wired or wireless communication links. Various communication protocols may be used to communicate data from diagnosability framework 112 to diagnosability framework 116.

As depicted in FIG. 1, diagnosability framework 112 comprises a diagnostic data extractor (DDE) 112a, a diagnostic data repository (DDR) 112b, a health monitor module 112c, and various tools 112d. The various components depicted in diagnosability framework 112 are merely examples of components that may be included in diagnosability framework 112. In alternate embodiments, diagnosability framework 112 may have less or more components than those shown. The components in diagnosability framework 112 may be implemented in software (e.g., code, program, instructions that are stored on a machine-readable medium and executed by a processor), hardware, or combinations thereof.

DDE 112a is configured to detect occurrences of conditions in system 110 and perform one or more actions in response to the detected conditions. In one embodiment, conditions detected in the monitored system may include one or more errors detected in the monitored system. In one embodiment, DDE 112a may be configured to provide a rule-based engine for determining all of the relevant diagnostic data to be gathered for a condition detected in monitored system 110 based on diagnostic context data associated with the detected condition. Diagnostic context data may comprise information related to components currently active on the call stack, component that signals the detected condition, a probable impact that the detected condition may have on system 110, and the like. In this manner, DDE 112a ensures that only diagnostic data that is relevant to the detected condition at the right level of detail is collected upon the occurrence or detection of the condition in monitored system 110.

In one embodiment, DDE 112a may be configured to create an incident upon occurrence of an error. In one embodiment, an incident represents a single occurrence of a critical error in system 110. An error in system 110 may be deemed as a critical error if the error is caused due to the working of system 110 itself as opposed to an error caused by a client or user's improper interactions with the system. A critical error may be an internal error, a system access violation, or some external errors detected in monitored system 110 (e.g., an object no longer exists).

In one embodiment, a set of rules may be specified for DDE 112*a* with each rule identifying one or more DDE conditions and one or more actions to be performed when the DDE conditions are met. An action may include gathering relevant diagnostic data for an error and storing the diagnostic data that is gathered for the error to a disk, invoking one or more health checks in response to errors or other conditions in the monitored system, recommending an action to be executed (i.e., user actions), and the like. Further information related to DDE 112*a* may be found in the applications incorporated by reference in the present application.

Diagnostic data repository (DDR) 112*b* (also sometimes referred to as ADR in the applications incorporated by reference in the present application) provides a centralized repository for storing diagnostic data related to monitored system 110 collected by diagnosability framework 112. The diagnostic data collected by diagnosability framework 112 may be stored in a structured format that enables searching and database-like querying capabilities. In one embodiment, DDR 112*b* is a file-based repository. Various different types of diagnostic data may be stored in DDR 112*b* such as traces, dumps, alert logs, health monitor reports, and the like. Information gathered and/or determined by health monitor module 112*c* (e.g., the status value determined for a health meter for monitored system 110) may be stored or dumped into DDR 112*b*.

In one embodiment, DDR 112*b* is capable of storing diagnostic data for multiple monitored systems such as multiple monitored systems 110. The diagnostic data collected for each monitored system 110 may be stored under a separate directory (e.g., an ADR_HOME directory) allocated to that system. The ADR_HOME directories share a common structure to facilitate analysis of the stored data across multiple monitored systems 110. Multiple ADR_HOME directories may be present under a single ADR_BASE directory. In this manner, diagnostic data for multiple monitored systems 110 may be stored and organized in a consistent manner.

In one embodiment, the diagnostic data stored in DDR 112*b* may be tagged or annotated with metadata information. The metadata information may be used to find correlations between pieces of the diagnostic data stored in DDR 112*b*. The metadata also enables navigation of the diagnostic data stored in DDR 112*b*. The metadata may include one or more correlation keys. Further information related to DDR 112*b* and correlation keys may be found in the applications incorporated by reference in the present application.

Health monitor module 112*c* is configured to perform one or more health checks in system 110 for diagnosing and/or gathering information related to the system. A health check may be invoked proactively on a scheduled basis, reactively in response to one or more errors or conditions in system 110, or may also be invoked manually by a user such as a system administrator for system 110. A health check is a function or task that is executed to determine information related to system 110. For example, a health check may be configured to gather information related to various aspects of system 110 including information related to one or more layers/components in system 110. In one embodiment, a health check is a piece of code that is executed by a processor and the execution of which results in information related to system 110 being determined and/or gathered for diagnostic purposes.

The information gathered by the execution of a health check may be used for various different purposes. For example, the information determined and/or gathered by a proactive health check may be used for early detection of errors and the prevention of such errors. This may limit or prevent the potential damages caused by these errors. Proactively gathered information may also be used for various other purposes.

The information gathered by the execution of a reactive health check in response to errors or other conditions in system 110 may be used for assessing the extent of damage caused by the errors, facilitating diagnostic analysis of the errors, limiting the amount of damages caused by the errors, and the like. For example, consider the situation in which data corruption is detected in system 110. The data corruption may cause a reactive health check to be executed that determines information related to the data corruption. The determined data may be used to assess the damage, if any, caused by the data corruption. A reactive health check is also useful in gathering time sensitive diagnostic data at the time of the error or condition. Such time-sensitive diagnostic data is many times highly relevant for diagnosing the cause of the error in the system in a timely manner. A reactive health check may also be used to influence the scheduling behavior of a proactive check. For example, if one or more errors related to a component or layer in system 110 are detected as a result of the execution of the reactive health check, it may be a good idea to increase the frequency of the proactive health check related to that particular component/layer in the hope of reducing occurrence of future errors of the same or similar kind.

The output of a health check may also be used to determine and provide recommendation for repairing an error, or reducing the damage caused by the error, or attending to a condition to prevent the condition from becoming an error. For example, data captured by a reactive health check executed in a response to a data corruption error may be used to provide recommendations to limit the amount of damages caused by the data corruption. Health monitor module 112*c* and its functions are discussed below in further details.

Various tools 112*d* may be provided as part of diagnosability framework 112. These tools may include tools for querying the information stored in diagnostic data repository 112*b*, tools for generating reports, analysis tools, and other tools that may use information collected and stored by diagnosability framework 112. Further information regarding tools 112*d* can be found in the applications incorporated by reference in the present application.

As mentioned previously, the diagnostics data collected by diagnosability framework 112 may also be forwarded to diagnosability framework 116 located at a remote site (for example, the site of a software system vendor) for analysis. As depicted in FIG. 1, diagnosability framework 116 may comprise a diagnostic data repository 116*b*, and one or more tools 116*c*. The various components depicted in the diagnosability framework 116 are merely examples of components that may be included in the diagnosability framework. In alternate embodiments, diagnosability framework 116 may have less or more components than those shown in FIG. 1. The components depicted in diagnosability framework 16 may be implemented in software, hardware, or combinations thereof.

In one embodiment, diagnostic data repository 116*b* provides a repository for storing diagnostic data received from one or more system sites. In one embodiment, the structure of diagnostic data repository 116*b* is the same as the structure of diagnostic data repository 112*b* at system sites. This facilitates efficient storage and analysis of the data. In such an embodiment, data received from system site packages is stored in the same directory location in diagnostic data repository 116*b* as the data that was stored in diagnostic data repository 112*b*.

Various tools 116*c* may be provided in diagnosability framework 116 to help analyze the diagnostic data received from diagnosability framework 112 and to guide management and resolution of problems and errors in monitored systems. These tools may include command line or GUI-based tools for use by personnel at the diagnosis site. For example, the tools may include a tool that may be used to analyze the diagnostic data received from the software system site and to identify causes for the errors, tools for automatically routing the diagnostic data to a correct entity (e.g., a particular group or department responsible for the software that experienced the error, one or more software developers responsible for solving the error, a system administrator, etc.) for diagnosis, and the like.

It should be noted that the instant application focuses on health monitor module 112*c* of diagnosability framework 112. Information related to the various other components of diagnosability system 100 may be found in the applications incorporated by reference in the present application.

Figure 2:
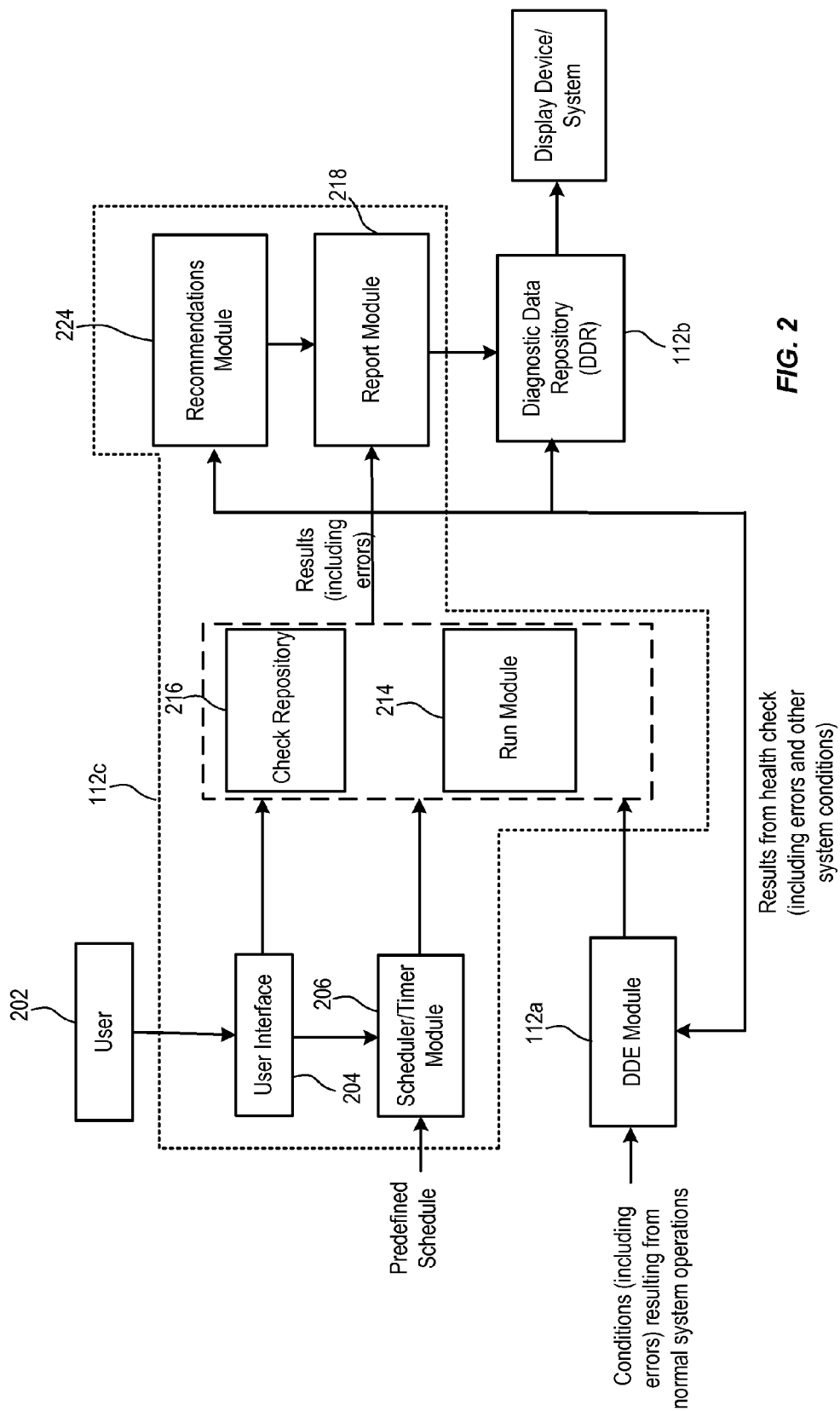
FIG. 2 is simplified block diagram depicting a health monitor module incorporating an embodiment of the present invention.

FIG. 2 is simplified block diagram depicting a health monitor module 112*c* incorporating an embodiment of the present invention. The various components depicted in FIG. 2 are merely examples of components that may be included in health monitor module 200. In alternate embodiments, health monitor module 200 may have less or more components than those shown in FIG. 2. The components depicted in FIG. 2 may be implemented in software (e.g., code, program, instructions that may be executed by a processor), hardware, or combinations thereof.

Health monitor module 112*c* is configured to perform one or more health checks in a system (e.g., monitored system 110 of FIG. 1) for diagnosing and/or gathering data related to the system. In one embodiment, one or more health checks may be defined for the monitored system and information related to these health checks may be stored in a check repository 216. The information stored in check repository 216 may include information identifying a health check and other information related to the health check, such as a piece of code to be executed by a processor to carry out the functions of the health check. The health checks stored in check repository 216 may be organized in classes of health checks based upon the system component or error to which the health checks are related to. The following lists some example classes of health checks that may be performed for a database system, such as databases and related products provided by Oracle Corporation of California:
  Checks for dictionary consistency
  Checks for data corruptions
  Checks for undo/redo corruptions
  Checks for memory corruptions and fragmentation issues
  Checks for global cache and global enqueues issues
  Checks for Shared cursors (unusual growth of child cursors)
  Checks for ensuring processes are calling "ksucki( )" at regular intervals Various interfaces and tools may be provided for creating a health check for the monitored system. For example, as depicted in FIG. 2, a user interface 204 may be provided that enables a user 202 to create health checks for the system. Other system-provided services may also be used to create health checks. For example, in an Oracle database system, a health check may be created using the "compile time service" (i.e., the check is first defined and built into Oracle binary). The following information may be used to define a health check for a database system:
  Category name: This defines the particular component/layer that is associated with the health check. The category name may include for example SPACE, INDEX, DATA, CACHE, MEMORY, OBJECTS, DICTIONARY, TRANSACTION, RECOVERY, SQL, OPTIMIZER, PDML, RAC, STREAMS, MANAGEABILITY, XML, ASM, GENERIC, etc.;
  Sub-category name: This further defines the component/layer that is associated with the health check. The sub-category name may include DICTIONARY-PARTITION;
  CheckerName: This may uniquely identify the name of the particular health check;
  Db-offline availability: This defines whether the health check may be invoked and executed when the system is not fully available, e.g., when the database is not mounted and/or opened. The Db-offline availability may be set to one of TRUE or FALSE;
  Crawling ability: This defines whether the health check may be executed in a crawling mode. Crawling mode will be discussed later. The crawling ability may be set to one of TRUE or FALSE;
  Invocation information: This is the information that may be used for locating the check, such as the call function name associated with the health check. For scheduled health checks, this information may also define a schedule per which the health check is to be invoked and executed.
  Default timeout: This is the default timeout associated with the health check. For example, a health check may be expired if not executed within the time window defined by the default timeout.

The information gathered by a health check or the function performed by a health check may depend upon the type of the system being monitored and the various layers/components in the system. For example, for a database product, the health checks may gather information related to dictionary consistency, information related to data corruptions, information related to memory corruptions and fragmentation issues, and the like.

In one embodiment, a health check may be invoked and executed only when the system is fully available, e.g., when a database system is mounted and opened. Accordingly, this type of health checks for a database system may be referred to as db-online checks. Alternatively, and as mentioned previously, some health checks may be invoked and executed even when the system is not fully available, e.g., when the database is not mounted and/or opened. This type of health checks may be referred to as db-offline checks for a database system. For example, a health check related to a shared cursor that looks for unusual growth of child cursors is an example of a db-online check.

A health check may be invoked and executed as a local check that is associated with a particular data instance. Alternatively, a health check may be invoked and executed as a global check that is associated with a global data structure or data pertaining to the entire database system. In one embodiment, at any instant of time, only one global check may be invoked and executed in the system. This is done to ensure that global data is not corrupted by concurrent execution of multiple health checks. A health check for a db system related to data dictionary is an example of a global check, whereas a check related to a shared cursor that looks for unusual growth of child cursors is an example of a local check.

A health check may be invoked proactively in a monitored system. For example, a health check may be scheduled to be performed on a periodic basis. Proactive health checks are generally executed to ensure that the monitored system is functioning properly and to allow for early detection of errors. Such early detection of errors helps to limit the potential damage caused by the error and also enables an administrator to take preventive actions quickly before the error becomes a critical error. An example of a scheduled health check in an Oracle db system is a "runaway process check" that may be invoked periodically. For example, in Oracle process architecture, a process may call a ksucki( ) function that checks for interrupts at regular time intervals. Such periodic checks for interrupts may facilitate inter-process coordination and other process management in the system. A failure to call such a function may be considered as an error in the system. Accordingly, it may be helpful to invoke a scheduled health check at regular intervals to detect if the ksucki( ) function has been called at the defined regular time intervals.

As depicted in FIG. 2, a scheduler/timer module 206 may be provided to facilitate execution of scheduled health checks. Scheduler 206 may access check repository 216 to determine when a health check is to be invoked. In one embodiment, a scheduled health check may be one of the two types depending upon when the check is scheduled. The first type of scheduled health check is a light-weight automatic health check that does not require to be scheduled in a designated maintenance window associated with the monitored system. For example, a light-weight automatic health check may be scheduled at any time as defined by the pre-defined schedule, such as every 2 hours. Generally, diagnostic-related actions and tasks that consume significant system resources and impact the processing of the system are executed in a specially designated maintenance window. A light-weight automatic health check typically consumes little resources and completes in a short span of time and as a result does not need to be scheduled in a designated maintenance window, although such a check may be executed in a designated maintenance window if desired.

The second type of a scheduled health check is a heavy-weight automatic health check that is typically scheduled to be executed in a designated maintenance window(s) associated with the system. A heavy-weight automatic health check typically consumes a considerable amount of system resources and takes a longer time for completion as compared to a light-weight automatic check.

In one embodiment, information regarding a scheduled health check, including information specifying a schedule for the health check, may be provided by a user 202 using a user interface 204. User 202 (e.g., a system administrator) may also enable or disable/cancel a scheduled health check via user interface 204. Alternatively, scheduler 206 may schedule a health check based on a predefined schedule that is configured for the system.

In one embodiment, a health check may be invoked reactively in response to one or more errors or other conditions detected in the system. As mentioned previously, the information gathered by execution of a reactive health check in response to an error or other system conditions may be used to assess the extent of the damage caused by the error conditions, facilitate diagnostic analysis of the error or conditions, and limit the amount of damage caused by the error or conditions. An example of a reactive health check is an "undo corruption" check. For example, when a database system encounters data corruptions or some conditions in the system that may lead to data corruptions (either in undo segments or data blocks), a reactive health check may be invoked in response to the error situation or the system conditions to assess the impacts that the error or the system conditions may have on the monitored system, to collect diagnostic information related to the error or system conditions, and to provide one or more recommendations to mitigate the damages/impacts caused by the error or system conditions. The following describes how a reactive check may be invoked upon occurrence of one or more errors or other conditions in the system according to an embodiment of the present invention.

As previously described DDE 112a is a rule-based engine that is configured to detect errors or other conditions in a monitored system and perform one or more actions in response to the detected errors and/or conditions. DDE module 112a may also create an incident for an error detected in the monitored system. In one embodiment, DDE module 112a may be configured to provide a rule-based engine for determining whether a health check should be invoked in response to a detected error or condition. A set of DDE rules may be configured for DDE module 112a. A DDE rule may identify a DDE condition and one or more actions to be performed when the DDE condition is met. The action to be performed when a DDE rule is satisfied may include determining and gathering diagnostic data that is deemed to be relevant to the detected condition in monitored system 110, recommending one or more actions to be performed, invoking health checks, and the like.

In one embodiment, a DDE rule in the set of DDE rules specified for DDE 112a may comprise the following components:

Error classification: The error classification may be based upon an error-code or a component of the system. When an error-code is used (with possible arguments), the rule may be triggered only if the incident that is generated as a result of an error is based upon that particular error-code. When a system component is used, the rule may be triggered based on a number of events originating from that component. An event may represent a potential incident that could result in an actual incident if the incident is not suppressed due to flood control of incidents in the system.

Density definition: The density definition indicates how many events are needed before invoking a health check. As mentioned above, an event may represent an incident generated by DDE module 210 upon occurrence of an error in the system. The rule is triggered only if there are appropriate number of events (appropriate given the error classification). For example, the density may be defined as the number of events that happen in one hour or the number of events that happen in one day. The rule is triggered only when that threshold is met or exceeded.

Check to activate: This defines which a particular health check is to be activated from the multiple health checks defined for the monitored system and stored in check repository 216. This component may also identify the scope of the function to be performed by the health check. In one embodiment, the "check to activate" component may include a health check name and accompanying input arguments, such as whether the check has crawling capability, default timeout value associated with the health check, etc. Once the rule is triggered, the particular health check having the appropriate health check name may be invoked with the input arguments.

Mode of activation: This defines how a particular health check should be performed or run. For example, a health check may be performed immediately or scheduled for execution at a later time, such as during a maintenance window associated with the system or some regular intervals (with optional expiration date).

Once the DDE condition specified in a DDE rule is satisfied, a health check that is called for in that DDE rule may be invoked. The DDE rules specified for DDE 112a may be tuned or modified automatically to suit the needs of the system.

In one embodiment, a health check from the set of health checks provided in check repository 216 may be invoked manually by a user 202 (e.g., system administrator) via a user interface 204. For example, a system administrator may invoke one or more health checks manually to gather information about a known issue present in the system and/or to discover some unknown issues in the system. In one embodiment, a view may be provided to the user that lists all the health checks available in check repository 216 for the user to select from.

After a health check has been invoked according to one of the schemes described above, namely proactively, reactively, or manually, the invoked health check may be executed by a run module 214. In one embodiment, a health check is a function and may correspond to a piece of code that is executed by a processor. Execution of a health check may result in information related to monitored system 110 being determined and/or gathered for diagnostic purposes. The determined and/or gathered information may be related to a particular layer or component in the system. As mentioned previously, the data gathered by the execution of a health check may be used for various different purposes. For example, the data gathered by a proactive health check may be used to achieve early detection of errors and to limit the potential damage caused by the errors in the system. On the other hand, the data gathered by a reactive health check in response to an error in the system may be used to assess the extent of the damages caused by the errors, facilitate diagnostic analysis of the errors, and limit the amount of damage caused by the errors. Additionally, a reactive health check may gather time sensitive diagnostic data at the time of the error. Such time-sensitive diagnostic data gathering may help capture information that is potentially highly relevant for diagnosing the cause of the error in the system in a timely manner.

In one embodiment, a health check may be executed in a crawling mode. In the crawling mode, a health check's state of progress during execution of the health check is preserved when the execution is stopped (e.g., interrupted or timed out) before its completion. Using the preserved state, when execution of the health check is resumed at a later non-contiguous point of time, the health check is able to remember its previous state when the execution of the check was stopped and continue the execution of the health check using the preserved state. For example, a health check that consumes a considerable amount of system resources and/or takes a long time for completion may be executed over different non-contiguous periods of time. In crawling mode, state information for a period of time may be preserved such that the preserved state information may be used for resuming the health check at a subsequent non-contiguous period of time. In this manner, the health check is able to continue its execution using the preserved state from the previous executions.

In one embodiment, run module 214 is configured to output the results from executing a health check. The results from the execution of a health check may include the information related to the monitored system that is determined and/or gathered for diagnostic purposes. For example, the health check results may comprise information, such as name for the particular health check executed, activation mode for the particular health check (e.g., whether the check was executed immediately or scheduled for later execution), information related to the other parameters associated with the particular health check (e.g., did the check run along with other normal user applications or did the check run in a confined maintenance window), information indicating whether the check was a global or local check, information indicating if the check was executed in a crawling mode, etc.), status information indicating the status of the health check (e.g., whether the health check was initialized, executed, interrupted, timeout, completed, canceled, or the execution of which results in a success, i.e., zero error detected), etc.

In one embodiment, the results from the execution of a health check may comprise information related to one or more conditions detected in the system. For example, the conditions may be one or more errors detected from executing the health check. The information related to an error that is detected from executing a health check may include:

Class information identifying a class that the error belongs to. Errors that belong to the same class may indicate that these errors are related to a common layer/component of the system. For example, all UNDO errors may belong to a class known as "Transaction (or UNDO layer)".

Priority information associated with the error. For example, the priority associated with an error may be one of "CRITICAL", "HIGH", or "LOW". CRITICAL may indicate that the error is a serious failure that has immediate consequences and may cause system malfunction if not attended to immediately; HIGH may indicate that the error is a serious failure that may potentially cause system outages if ignored; LOW may indicate that the error is of a non-serious nature that need not be taken care of immediately.

Associated parameters information: A set of parameters may be associated with an error that describe a particular instance of that error type. For example, for a "BLOCK_CORRUPTION" error type, the associated parameters for a particular error instance of that error type may include information such as "BLOCK_NO (block number)" and "FILE_NO (file number). The block number and file number describes a particular instance of the "BLOCK_CORRUPTION" error type.

Message: A message may be associated with an error that provides a descriptive understandable explanation of the error to an external users, such as a DBA. For example, the error "BLOCK_CORRUPTION" may be associated with a message that reads "Block Corruption was detected on Block No: % d in File: % d."

Damage description: A damage description information may be associated with an error that describes the error from the perspective of users such as DBA(s) and that provides more detail on where the damage caused by the error may have occurred. For example, a block corruption error impact description may have an associated damage description identifying the tables that are affected by the corruption, etc. These affected table names may be useful for DBA(s) to understand what kind of data is corrupted by the error and how to resolve them.

Validation check: A "validation check" may be associated with an error and may be used to confirm the existence of the error at a later point of time than the time of the error occurrence. Further information regarding validation checks is provided below.

Error aggregation: Certain errors may be aggregated to form an aggregated error. An aggregated error may represent an error category that one or more individual errors belong to. For example, errors may be aggregated or categorized based on their type, class, etc. Aggregation of errors facilitates handling of errors as a group. Error aggregation is discussed below.

As previously described DDE 112*a* is a rule-based engine that is configured to detect errors or other conditions in a monitored system and perform one or more actions in response to the detected errors and/or conditions. A set of rules for DDE 112*a* may specify DDE conditions and actions to be performed when the DDE conditions are met. For example, the DDE conditions may relate to error classifications and/or density of incidents, while the actions may include invoking a health check when the DDE condition specified in a DDE rule is satisfied. If the DDE condition specified in a DDE rule is satisfied, a health check that is called for in that rule may be invoked. Accordingly, the results from executing the health check, including information related to one or more errors and other conditions that are detected by the execution of the health check may be provided to DDE 112*a* (This is shown as a feedback loop in FIG. 2). These results are then evaluated by DDE 112*a* to determine if a health check should be invoked in response to the errors or other conditions detected in the system. For example, information gathered by a proactive health check may lead to discovery of an error in the monitored system and this error may cause invocation and execution of a reactive health check in response to the error discovered by the proactive health check.

In one embodiment, one or more recommendations may be generated for errors or other conditions that are detected as a result of the execution of a health check. For example, a recommendation may be generated for system administrators to install a new disk or reduce disk usage when the health check detects a condition that the disk space is close to being full. A recommendation may be generated by a recommendation module 224 based upon the type of errors and/or conditions discovered and other information gathered by the execution of the health check. In one embodiment, the recommendation may be in the form of a textual description describing one or more actions to be performed to mitigate the impact of the errors that are discovered as a result of the execution of a health check. In another embodiment, a recommendation may be in the form of repairable actions (e.g., repair scripts) that may be performed or generated for repairing the errors discovered. In one embodiment, a single recommendation may be associated with more than one type of errors. Alternatively, a single error may be associated with more than one recommendations. The recommendation information may be output via user interface 240 or an output display. The recommendation information may also be forwarded to report module 218 for generating a report. The recommendation information may also be stored in diagnostic data repository 112*b*.

In one embodiment, the information determined and/or gathered by the execution of a health check is organized and stored in diagnostic data repository 112*b*. For example, diagnostic data repository 112 may store information that indicates the status of all the scheduled health checks (e.g., whether the health check is initialized, executed, interrupted, timeout, completed, canceled, or the execution of which results in a success, i.e., zero error detected, or one or more errors).

In one embodiment, a report may be generated based upon the information determined and/or gathered by the execution of a health check. The report may comprise various piece of information related to the health check, such as name for the particular health check executed, activation mode for the particular health check, information related to the other parameters associated with the particular health check, information indicating whether the check was a global or local check, information indicating if the check was executed in a crawling mode, status information indicating the status of the health check, one or more errors or other conditions detected in the system as a result of the health check, one or more recommendations generated for the errors or other conditions detected, and the like. For example, in the embodiment depicted in FIG. 2, the report may be generated by a report module 218 and stored in diagnostic data repository 112*b*. The report may be displayed through a display device or system, as depicted in FIG. 2.

Figure 3:
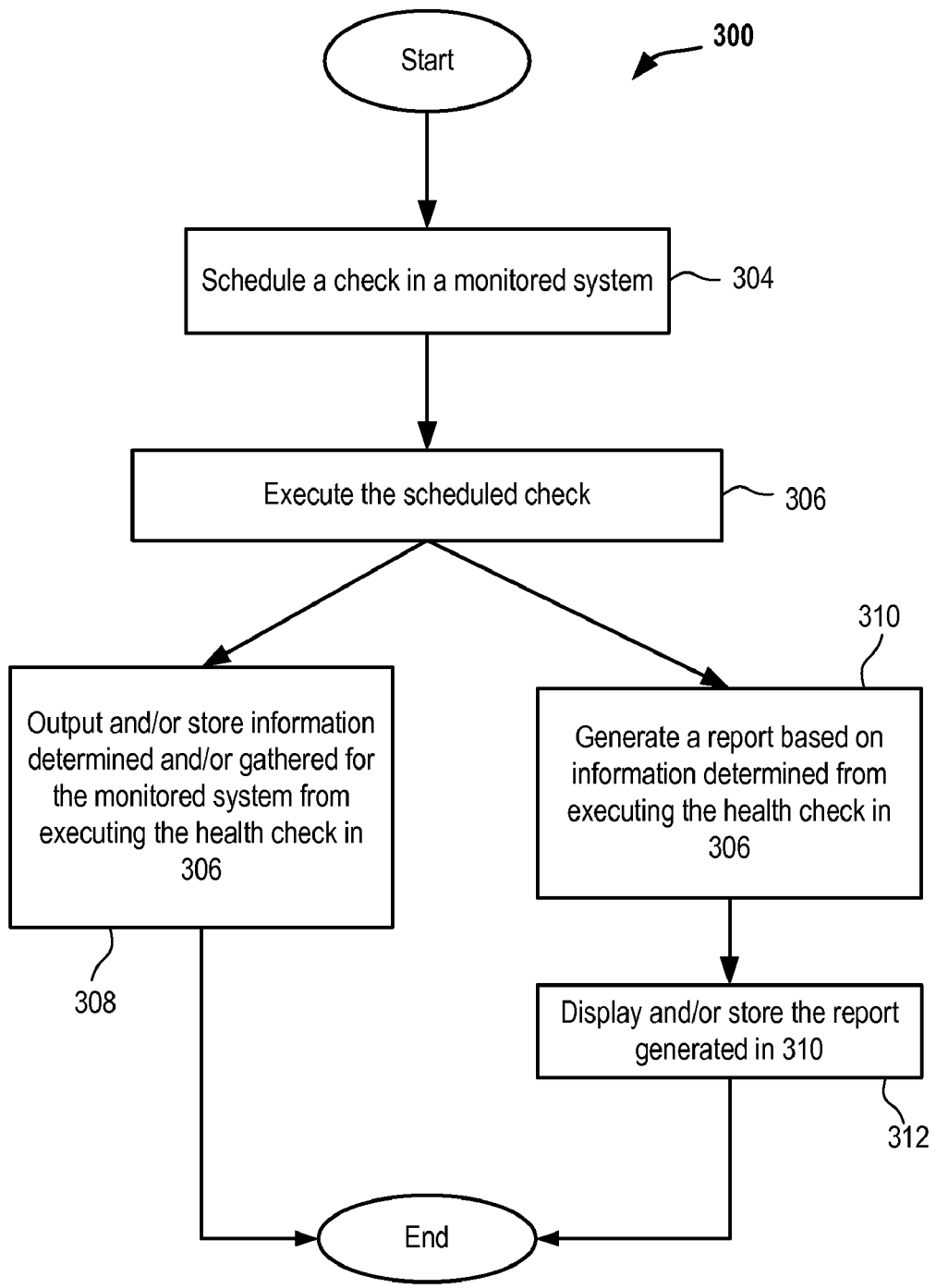
FIG. 3 is a simplified flow chart depicting a method for scheduling and executing a proactive health check according to an embodiment of the present invention.

FIG. 3 is a simplified flow chart 300 depicting a method for scheduling and invoking a proactive health check according to an embodiment of the present invention. The processing depicted in FIG. 3 may be performed by software (executed by a processor), hardware, or combinations thereof.

Referring to FIG. 3, at 304, a proactive health check is scheduled for a monitored system. In one embodiment, the scheduling of a proactive check may be done by making an entry into a schedule information repository. There may be several considerations when scheduling a health check:

Should the check be running along with other normal user applications? In this case, the check may be scheduled as a light-weight automatic check that consumes only a limited amount of system resources.

Should the check be scheduled to run in a maintenance window? In this case, the check may be scheduled as a heavy-weight automatic check, which is expected to consume considerable system resources and take long time to complete.

Is the check global in nature? If so, the health monitor framework would pre-allocate a global ID for this check. The global ID will ensure only one system instance can run this check at a given time.

Should the check have crawling facilities? The crawling capability provides the check with an ability to preserve its state of progress when it is interrupted or timed out. In one embodiment, the crawling facilities schedules a lengthy health check as several light weight automatic checks, each of which may be executed at different instant of time.

At 306, the scheduled check is executed according to the scheduled time. The scheduled health check may be configured to determine information related to one or more aspects of a monitored system including information related to one or more layers/components in the monitored system. In one embodiment, the scheduled health check is a piece of code that is executed and the execution of which results in information related to a monitored system being determined and/or gathered for diagnostic purposes.

At 308, information that is determined and/or gathered from executing the health check in 306 may be output and/or stored. For example, the information may be output to a user via a display device or other interface. The information may also be stored, for example, in diagnostic data repository 112*b*. The information that is output and/or stored may comprise various types of health check information such as name of the health check, activation mode of the particular health check (e.g., whether the check may be executed immediately or scheduled for later execution), information related to one or more errors or other conditions that may be discovered by the execution of the particular health check, information related to one or more incidents that may be created for the one or more errors detected by the execution of the health check, and one or more recommendations for the errors or other conditions that are discovered as a result of the execution of the health check, etc. The information that is output and/or stored may also include status information indicating the status of the health check (e.g., whether the health check is initialized, executed, interrupted, timeout, completed, canceled, or the execution of which results in a success, i.e., zero error detected, or one or more errors).

At 310, a report may optionally be generated based on the information determined from execution of the health check in 306. The report may be stored in a diagnostic data repository, such as diagnostic data repository 112b of FIG. 1 and/or output to the user. For example, the report may be displayed via a display device/system.

Figure 4:
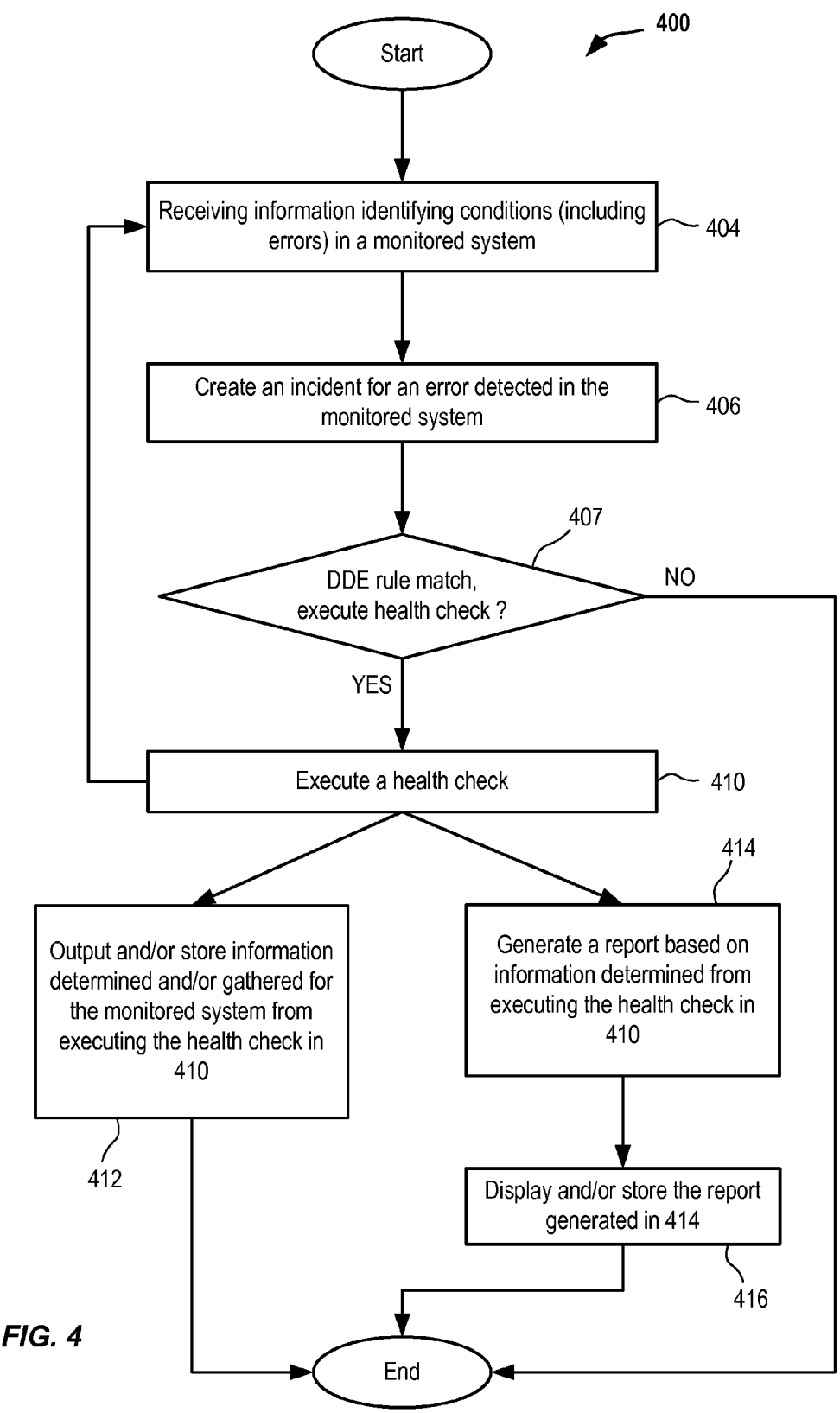
FIG. 4 is a simplified flow chart depicting a method for executing a reactive health check according to an embodiment of the present invention.

As previously described, the information determined from running a proactive health check may trigger a reactive health check in response to errors or other system conditions detected in a monitored system. FIG. 4 is a simplified flow chart 400 depicting a method for executing a reactive health check according to an embodiment of the present invention. The processing depicted in FIG. 4 may be performed by software (executed by a processor), hardware, or combinations thereof.

Referring to FIG. 4, at 404, information is received identifying errors or other conditions detected in a monitored system. The information received in 404 may include information resulting from normal system operations or information resulting from the execution of a health check, either a proactive, reactive, or manual health check. In one embodiment, the information in 404 is received by DDE 112a. At 406, DDE 112a may create an incident for one or more errors detected in the system from the information received in 404.

At 407, processing may be performed to determine if a health check is to be executed due to matching of one or more DDE rules based upon information received in 404. Accordingly, in 407 a determination is made to see if the information received in 404 triggers a health check. As previously described DDE 112a is a rule-based engine that is configured to perform actions upon matching of one or more rules. The set of rules configured for the DDE may identify one or more DDE conditions and one or more actions to be performed when the DDE conditions are met. One such action may include invoking a health check when the DDE condition specified in the associated DDE rule is satisfied. Accordingly, if it is determined in 407 that the information received in 404 matches a DDE rule and the action associated with the matched rule is execution of a health check, the health check (reactive health check) is executed in 410. In one embodiment, the reactive health check is a piece of code that is executed and the execution of which results in information related to a monitored system being determined and/or gathered for diagnostic purposes.

At 412, information that is determined and/or gathered from executing the health check in 410 may be output and/or stored. For example, the information may be output to a user via a display device or other interface. The information may also be stored, for example, in diagnostic data repository 112b. The information that is output and/or stored may comprise various types of information related to the health check such as name of the health check, activation mode of the particular health check (e.g., whether the check may be executed immediately or scheduled for later execution), information related to one or more errors or other conditions that may be discovered by the execution of the particular health check, information related to one or more incidents that may be created for the one or more errors detected by the execution of the health check, and one or more recommendations for the errors or other conditions that are discovered as a result of the execution of the health check, etc. The information that is output and/or stored may also include status information indicating the status of the health check (e.g., whether the health check is initialized, executed, interrupted, timeout, completed, canceled, or the execution of which results in a success, i.e., zero error detected, or one or more errors).

At 414, a report may optionally be generated based on the information determined from execution of the health check in 410. The report may be stored in a diagnostic data repository, such as diagnostic data repository 112b of FIG. 1 and/or output to the user. For example, the report may be displayed via a display device/system.

As mentioned previously, the execution of a health check may result in the detection of one or more errors (i.e., failures) in the monitored system. In one embodiment, the errors may be aggregated to form an aggregated error. An aggregated error may represent an error category that one or more individual errors belong to. Aggregation of errors facilitates handling of errors as a group. For example, consider an error known as 'BLOCK_CORRUPTION'. If many BLOCKS in an Oracle file are corrupted, all those 'BLOCK Corruptions' may be represented using a single error category, such as 'MULTI_BLOCK_CORRUPTION' or 'FILE_CORRUPTION'.

Figure 5:
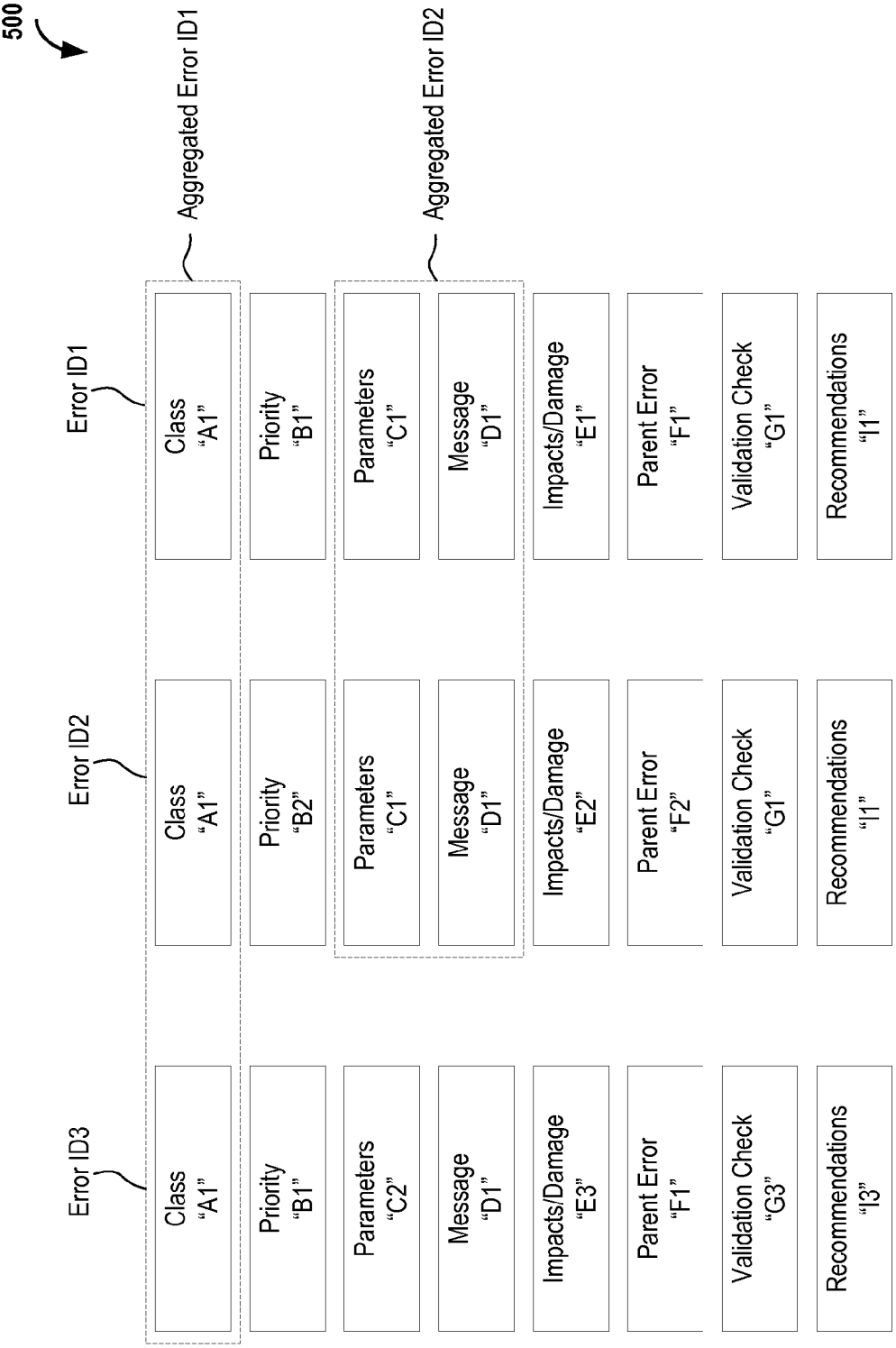
FIG. 5 is a simplified block diagram depicting aggregation of errors according to an embodiment of the present invention.

FIG. 5 is a simplified block diagram depicting aggregation of errors according to an embodiment of the present invention. The aggregation concept depicted in FIG. 5 may be implemented in software (executed by a processor), hardware, or combinations thereof.

Referring to FIG. 5, error ID1, error ID2, and error ID3 may represent the errors that are detected in a monitored system. Although only three errors are depicted in FIG. 5, there may be any number of errors that may be detected in the system. As mentioned previously, an error may be associated with a number of characteristics, such as class, priority, error messages, error parameters, error impact information, parent error, validation check defined for the error, and recommendations for the error. For example, error ID1 may belong to class "A1" and may have an associated priority value of "B1", associated parameters "C1", associated error messages D1, associated impact information "E1", associated parent error "F1", associated validation check "G1", and associated recommendations "I1", and so on forth.

In one embodiment, one or more aggregation rules may be defined or provided that specify how the errors may be aggregated. For example, an aggregation rule may specify that errors belonging to class "A1" may be aggregated to form an aggregate error ID1. Another example aggregation rule may specify that errors that have an associated parameters "C1" and associated messages "D1" may be aggregated to form an aggregated error ID2. In such an embodiment, upon detection of errors during execution of one or more health checks in the system, the aggregation rules may be applied to determine how the errors may be aggregated based upon their respective associated characteristics. For example, as depicted in FIG. 5, error ID1, error ID2, and error ID3 may be aggregated to form aggregated error ID1 as these errors belong to the same class "A1" and satisfy an aggregation rule. Error ID1 and error ID2 may be aggregated to form aggregated error ID2 as these errors have common associated parameters "C1" and messages "D1".

As mentioned above, a validation check may be associated with an error. The validation check may be performed for the error to confirm the existence or non-existence of the error at a later point of time than the time of the error occurrence. This feature is useful to remove those errors that are no longer valid or do not exist, e.g., errors that may have been resolved or have timed out.

Figure 6:
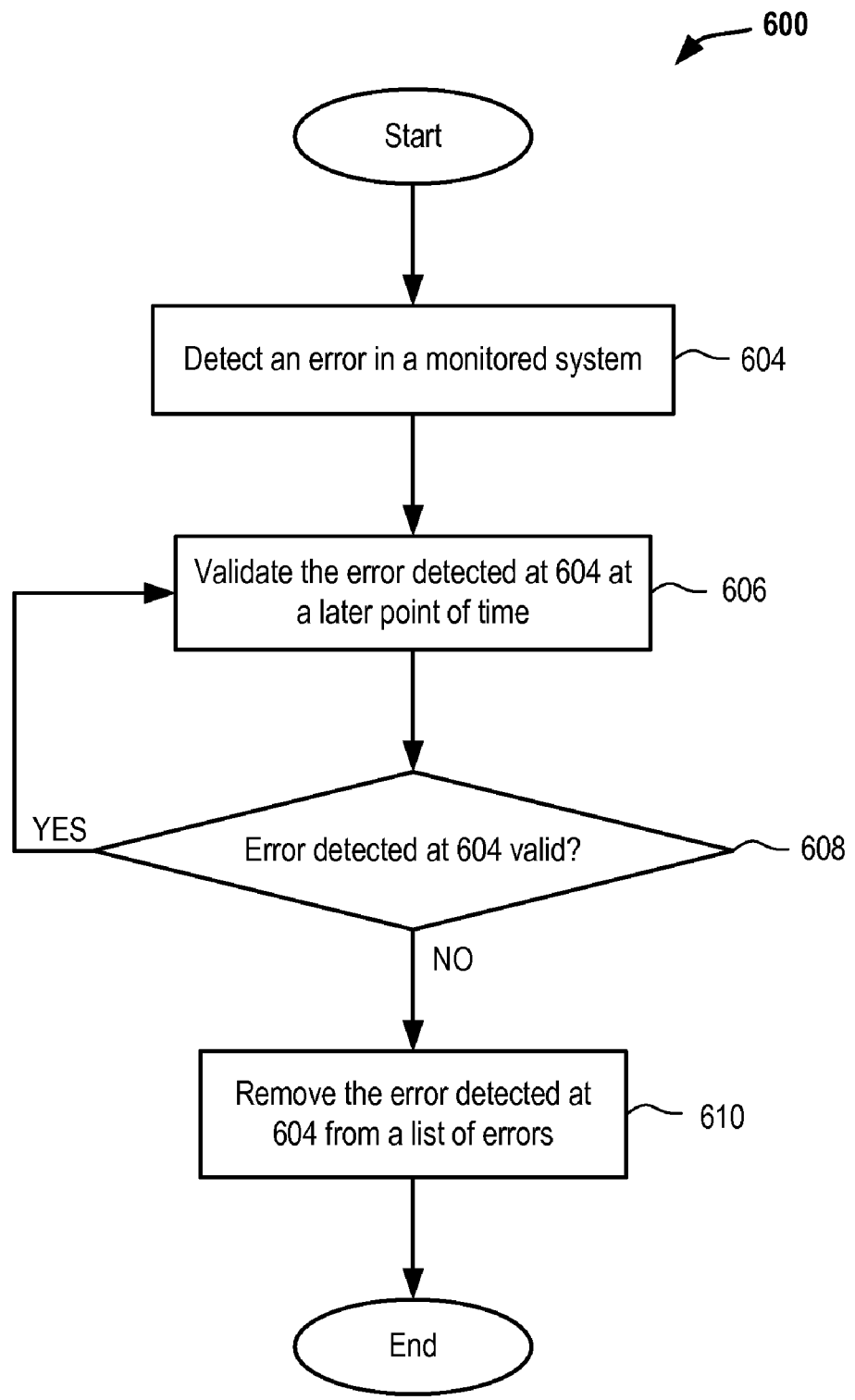
FIG. 6 is a simplified flow chart depicting a method for performing a validation check on an error according to an embodiment of the present invention.

FIG. 6 is a simplified flow chart 600 depicting a method for performing one or more validation checks associated with an error according to an embodiment of the present invention. The processing depicted in FIG. 6 may be performed by software (executed by a processor), hardware, or combinations thereof.

Referring to FIG. 6, at 604, an error is detected in a monitored system. The detected error may be added to a list of errors detected in the monitored system. At 606, the error is validated at a later point of time after the occurrence of the error. As part of 606, processing may be performed to determine if the error detected in 604 is resolved or timed out or continues to be an error. In one embodiment, an error is considered as valid if the error has not been resolved and has not timed out. If it is determined in 608 that the error is still valid, the error is then revalidated at some later point in time. In one embodiment, the error may be revalidated on a periodic basis to confirm its existence or non-existence. If it is determined in 608 that the error is no longer valid (or invalid), then the error may be removed from a list of errors present in the monitored system at 610. In one embodiment, an error may be considered as no longer valid if the error had been resolved or has expired.

Figure 7:
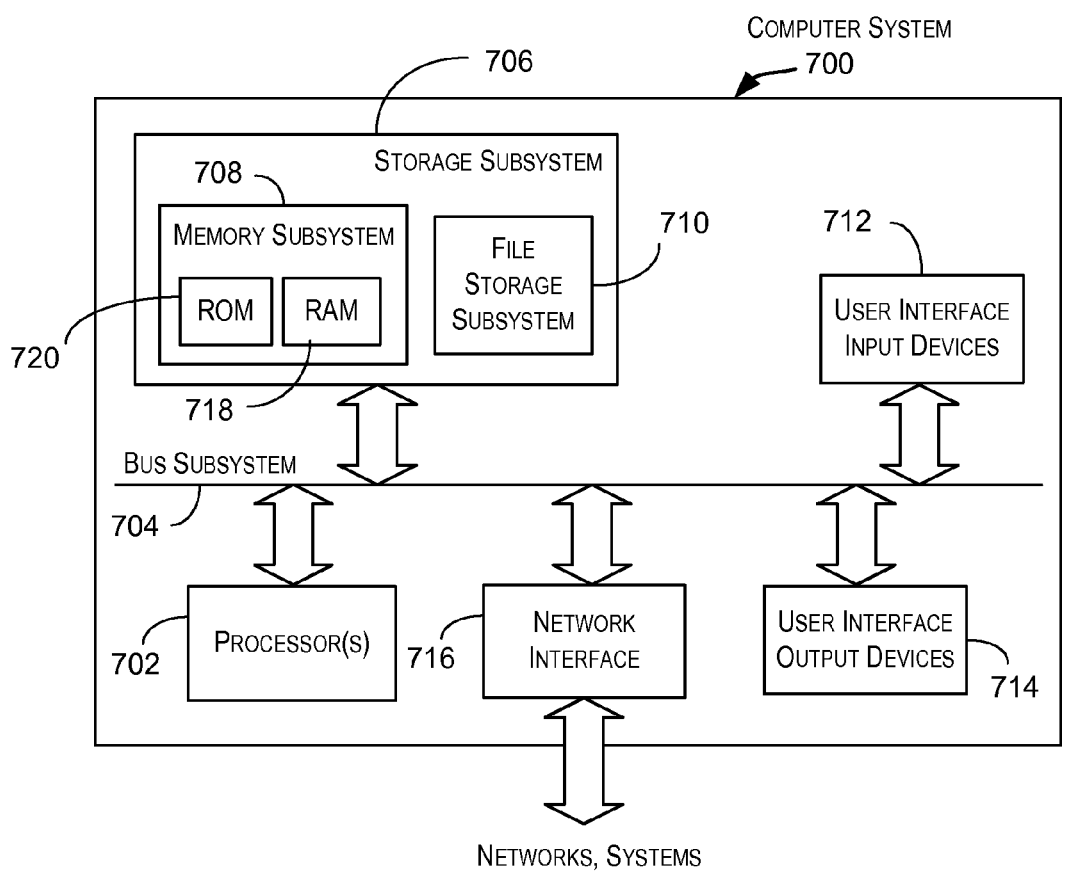
FIG. 7 is a simplified block diagram of a computer system that may be used to practice an embodiment of the various inventions described in this application.

FIG. 7 is a simplified block diagram of a computer system 700 that may be used to practice an embodiment of the various inventions described in this application. Computer system 700 may serve as the platform for the diagnosability frameworks depicted in FIG. 1. For example, a computer system 700 at the monitored system site may serve as a platform for diagnosability framework 112. A computer system 700 located at a diagnosis site may serve as a platform for diagnosability framework 116. A diagnosability framework may also be distributed across multiple computer systems.

As shown in FIG. 7, computer system 700 includes a processor 702 that communicates with a number of peripheral subsystems via a bus subsystem 704. These peripheral subsystems may include a storage subsystem 706, comprising a memory subsystem 708 and a file storage subsystem 710, user interface input devices 712, user interface output devices 714, and a network interface subsystem 716.

Bus subsystem 704 provides a mechanism for letting the various components and subsystems of computer system 700 communicate with each other as intended. Although bus subsystem 704 is shown schematically as a single bus, alternative embodiments of the bus subsystem may utilize multiple busses.

Network interface subsystem 716 provides an interface to other computer systems, networks, and portals. Network interface subsystem 716 serves as an interface for receiving data from and transmitting data to other systems from computer system 700. For example, for the diagnosability framework deployed at the customer site or site where the software system is deployed, network interface subsystem 716 may be configured to transfer diagnostic packages from the customer site to the vendor or diagnosis site.

User interface input devices 712 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 700.

User interface output devices 714 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 provides a computer-readable medium for storing the basic programming and data constructs that provide the functionality of the present invention. Software (code modules or instructions) that provides the functionality of the present invention may be stored in storage subsystem 706. These software modules or instructions may be executed by processor(s) 702. Storage subsystem 706 may also provide a repository for storing data used in accordance with the present invention such as the diagnostic data repository. Storage subsystem 706 may comprise memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 700 can be of various types including a personal computer, a portable computer, a workstation, a network computer, a mainframe, a kiosk, a server or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. While the embodiments of the diagnosability framework have been described as providing diagnostic support for software product instances, in alternative embodiments, embodiments of the present invention may be used for providing diagnostic support for software products, hardware products, or products having combination of software and hardware.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method for monitoring a system, comprising:
   executing, by a computer system, a health check to determine information related to the system, wherein the health check is invoked based upon a predefined schedule or in response to one or more conditions detected in the system, and executing the health check comprises:
   executing, by the computer system, a first portion of the health check,
   stopping, by the computer system, execution of the first portion of the health check before completion of the health check,
   preserving, by the computer system, the state of the health check as preserved state information, and
   continuing, by the computer system and using the preserved state information, execution of the health check at a point in time that is subsequent to and non-contiguous from the end of the execution of the first portion of the health check; and
   outputting, by the computer system, the information related to the system determined from executing the health check.

2. The method of claim 1 wherein, the health check is invoked based upon a predefined schedule comprises scheduling the health check in a designated maintenance window.

3. The method of claim 1 wherein the one or more conditions detected in the system identify an error in the system and the health check is invoked in response to the error.

4. The method of claim 1 wherein executing the health check comprises:
   determining a set of one or more rules configured for the system, each rule specifying one or more conditions and an action to be performed when the one or more conditions are satisfied; and
   determining that the one or more conditions associated with a first rule from the set of rules are satisfied by the one or more conditions detected in the system, wherein the action specified by the first rule is the execution of the health check.

5. The method of claim 1 further comprising detecting one or more errors based upon information determined from executing the health check.

6. The method of claim 5 further comprising aggregating the one or more errors to form an aggregated error based upon information associated with the one or more errors.

7. The method of claim 5 further comprising periodically validating the one or more errors.

8. The method of claim 5 further comprising providing a recommendation for at least one error from the one or more errors detected from executing the health check, the recommendation identifying one or more actions to be performed for repairing or mitigating an impact of the at least one error.

9. The method of claim 1 further comprising:
   determining a set of one or more rules configured for the system, each rule specifying one or more conditions and an action to be performed when the one or more conditions are satisfied; and
   determining a first rule from the set of rules whose associated one or more conditions are satisfied based upon information determined from executing the health check; and
   executing an action specified by the first rule, wherein executing the action comprises executing a second health check.

10. The method of claim 1 further comprising generating a report based upon information determined from executing the health check.

11. A computer-readable storage medium storing a plurality of instructions for controlling a processor to monitor a system, the plurality of instructions comprising:
   instructions that cause the processor to execute a health check to determine information related to the system, wherein the health check is invoked based upon a predefined schedule or in response to the one or more conditions detected in the system, and the instructions that cause the processor to execute the health check comprise:
   instructions that execute a first portion of the health check,
   instructions that stop execution of the first portion of the health check before completion of the health check,
   instructions that preserve the state of the health check as preserved state information, and
   instructions that continue the execution of the health check using the preserved state information at a point in time that is subsequent to and non-contiguous from the end of the execution of the first portion of the health check; and
   instructions that cause the processor to output the information related to the system determined from executing the health check.

12. The computer-readable storage medium of claim 11 wherein the instructions that cause the processor to execute the health check comprise:
   instructions that cause the processor to determine a set of one or more rules configured for the system, each rule specifying one or more conditions and an action to be performed when the one or more conditions are satisfied; and
   instructions that cause the processor to determine that the one or more conditions associated with a first rule from the set of rules are satisfied by the one or more conditions detected in the system, wherein the action specified by the first rule is the execution of the health check.

13. The computer-readable storage medium of claim 11 wherein the plurality of instructions further comprises instructions that cause the processor to detect one or more errors based upon information determined from executing the health check.

14. The computer-readable storage medium of claim 13 wherein the plurality of instructions further comprises instructions that cause the processor to aggregate the one or more errors to form an aggregated error based upon information associated with the one or more errors.

15. The computer-readable storage medium of claim 13 wherein the plurality of instructions further comprises instructions that cause the processor to periodically validate the one or more errors.

16. The computer-readable storage medium of claim 13 wherein the plurality of instructions further comprises instructions that cause the processor to provide a recommendation for at least one error from the one or more errors detected from executing the health check, the recommendation identifying one or more actions to be performed for repairing or mitigating an impact of the at least one error.

17. The computer-readable storage medium of claim 11 wherein the plurality of instructions further comprises instructions that cause the processor to generate a report based upon information determined from executing the health check.

18. A monitoring system for monitoring a monitored system, the monitoring system comprising:

a memory; and a processor coupled to the memory;

wherein the processor is configured to:

execute a health check to determine information related to the monitored system, wherein the health check is invoked based upon a predefined schedule or in response to one or more conditions detected in the monitored system, and the processor is further configured to:

execute a first portion of the health check, stop execution of the health check before completion of the health check, preserve the state of the health check as preserved state information, and continue, using the preserved state information, execution of the health check at a point in time that is subsequent to and non-contiguous from the end of the execution of the first portion of the health check first time window using information stored from the execution of the health check; and output the information related to the monitored system determined from executing the health check.

\* \* \* \* \*

UNITED STATES PATENT AND TRADEMARK OFFICE
CERTIFICATE OF CORRECTION

PATENT NO.         : 8,161,323 B2
APPLICATION NO.    : 12/252128
DATED              : April 17, 2012
INVENTOR(S)        : Kuchibhotla et al.

It is certified that error appears in the above-identified patent and that said Letters Patent is hereby corrected as shown below:

On cover page, item (75), in column 1, under "Inventors", line 1, delete "Balasubrahmanya" and insert -- Balasubrahmanyam --, therefor.

In column 1, line 7, delete "119" and insert -- §119 --, therefor.

In column 1, line 42, delete "METER;" and insert -- METER. --, therefor.

In column 7, line 60, after "intervals" insert -- . --.

In column 8, line 31, delete "executed." and insert -- executed; --, therefor.

In column 22, line 9-10, in Claim 18, delete "check first time window using information stored from the execution of the health check; and" and insert -- check; and --, therefor.

Signed and Sealed this
Twenty-fourth Day of July, 2012

David J. Kappos
*Director of the United States Patent and Trademark Office*